Oct. 15, 1968  D. M. LEWIS ET AL  3,406,196
OXIDATION OF POLYALKYL AROMATICS TO POLYCARBOXYLIC ACIDS
Filed Sept. 30, 1964

INVENTORS
DONALD M. LEWIS
FREDERICK J. SEBELIST

BY

ATTORNEY

United States Patent Office 3,406,196
Patented Oct. 15, 1968

3,406,196
OXIDATION OF POLYALKYL AROMATICS
TO POLYCARBOXYLIC ACIDS
Donald M. Lewis, Wilmington, Del., and Frederick J. Sebelist, Chadds Ford, Pa., assignors to E. I. du Pont de Nemours and Company, Wilmington, Del., a corporation of Delaware
Filed Sept. 30, 1964, Ser. No. 400,354
4 Claims. (Cl. 260—524)

ABSTRACT OF THE DISCLOSURE

Improvement in the process for oxidation of alkyl substituted aromatics to polycarboxylic acids with molecular oxygen in the presence of bromine and metal oxidation catalyst which involves partial oxidation, preferably without added solvent in a first stage followed by a second-stage oxidation at higher temperature with water addition.

Figure 1:
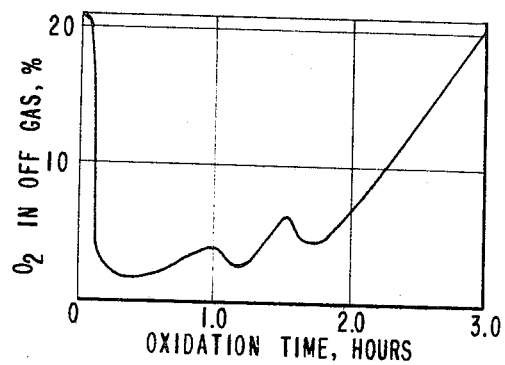

Over approximately the past two decades, organic compounds in which two or more carboxylic acid groups are bonded to one or more carbocyclic and/or heterocyclic aromatic nuclei have become of increasing interest, either as direct components of, or as intermediates for, synthetic condensation polymer molecules. Efforts in this field have led to the development of several broad categories of condensation polymers in which the aromatic polycarboxylic acids and their simple derivatives have been found to be useful, including polyanhydrides, polyesters, polyamides, polyimides, and polyhydrazides, as well as other linear and crosslinked polymers obtained by further reactions of such condensation polymer molecules. Some of the polymers containing in the molecule repeating units derived from aromatic polycarboxylic acids have found broad-spectrum utility in synthetic fibers and films, as well as in various types of resin formulations, whereas others of such polymers have been more limited in scope of application, but not less useful.

The more common nuclei of aromatic polycarboxylic acids forming useful polymers include the benzene nucleus, the fused ring naphthalene nucleus, the pyridine nucleus, and certain simple and more complex bridged aromatic ring systems. The last mentioned group can be pictured most simply by the formulas: Ar—Ar′ and Ar″—X—Ar‴, where the groups, Ar to Ar‴, represent like or different cyclic aromatic nuclei, Ar and Ar′ are directly linked cyclic aromatic radicals, and X represents a bridge atom or radical linking the cyclic aromatic radicals Ar″ and Ar‴ to each other. In some cases, the aromatic nuclei of such polycarboxylic acids will contain one or more additional ring substituents, such as amino, nitro, halogen, hydroxyl, cyano, sulfonyl, and like groups. These additional groups do not all participate in principal polymer-forming reactions, but they can be desirable molecular constituents, either because of the properties they impart to the polymer or because they render the initial polymer molecules susceptible to modification by further reaction. An exemplary but nonexhaustive group of specific aromatic polycarboxylic acids that have found utility in the polymer field include the three phthalic (benzenedicarboxylic) acid isomers; the benzenetricarboxylic acids, particularly trimellitic and trimesic acids; the benzenetetracarboxylic acids, particularly pyromellitic acid; the naphthalenedi- and polycarboxylic acids; the diphenyldicarboxylic (diphenic) acid isomers; and certain bridged-ring di-, tri-, and tetracarboxylic acids of the type Ar″—X—Ar‴ referred to hereinbefore, where the Ar groups are usually benzenoid nuclei and the bridging atom or group, X, can be, for example, —O—, —SO—, —SO$_2$—, —CO—, or —[C(R)(R′)]—$_n$, in which R and R′ represent hydrogen or organic radicals and $n$ is a positive integer of at least one. The aromatic nuclei of these acids can bear other substituents, e.g., of the types mentioned above, in addition to the multiple carboxylic acid functions.

The aromatic polycarboxylic acids used in polymers generally are produced by subjecting aromatic compounds having a plurality of appropriately positioned alkyl substituents on the aromatic ring or rings to oxidation processes. Molecular oxygen-containing gases, particularly air itself, and nitric acid or the higher oxides of nitrogen are the two types of oxidizing agents commonly used for large-scale oxidations, owing to their general effectiveness, availability, and relatively low cost. No matter which of these oxidizing agents is chosen, it usually is relatively easy to oxidize one alkyl substituent in such polyalkylated aromatic molecules to produce a carboxylic acid group. However, generally speaking, the presence of one or more carboxylic acid groups make oxidation of any alkyl groups remaining in the molecule considerably more difficult. Workers in the field have proposed and, with some success, used various means of forcing the oxidation of a plurality of alkyl groups in polyalkylated aromatic molecules to the carboxylic acid stage.

One process developed in recent years for oxidizing polyalkylated aromatics in liquid phase with molecular oxygen-containing gas overcomes many of the problems associated with conversion of multiple alkyl groups in the molecule to a plurality of carboxylic acid groups. This oxidation process, disclosed in U.S. Patent 2,833,816, is characterized by use of an oxidation-promoting system including both bromine, i.e., either elemental or chemically combined forms of bromine, and metal oxidation catalyst. In order to obtain efficient heat transfer and high rates of oxidation in this heterogeneous reaction system, it generally has been considered necessary to conduct the oxidations in the presence of a relatively difficultly oxidizable organic liquid in which a major portion of the organic reactants and products remain dissolved or suspended. Cyclic ethers and esters and particularly low-molecular-weight fatty acids, e.g., acetic acid, have been used as such reaction media. The need for the organic medium, however, imposes an economic penalty on the subject process, both on the basis of increased material costs and on the basis of the additional processing steps required. Not only is it necessary to provide for efficient and complete separation of the desired product from the organic reaction medium if polymer-grade polycarboxylic acids are to be obtained, but also the medium recovered usually must be additionally purified or otherwise reconstituted before it is suitable for further use in the oxidation process.

It also has been proposed to conduct the oxidation of alkylated aromatic compounds in the presence of promoter systems containing bromine in a reaction medium consisting principally of water. In this oxidation process, which is disclosed in U.S. Patent 2,907,792, the organic compound to be oxidized and the bromine promoter, plus any heavy metal oxidation catalyst introduced, are dissolved or suspended in water in an amount such that the water constitutes on the order of 90% or more of the initial liquid phase. Acceptable rates of oxidation and fairly high yields of polycarboxylic acids have been demonstrated in this process when the organic compound subjected to oxidation is a partially oxidized derivative of a polyalkylated aromatic compound. However, in the case of oxidation of polyalkylated aromatic compounds containing carbon and hydrogen but no oxygen in the substituent groups, and particularly when the alkyl groups are linked to the aromatic rings by primary carbon atoms, as is true in polymethylated aromatics such as the xylenes, oxidation is much slower and yields of polycarboxylic acids also are lower. Hence, although water potentially is an attractive medium for oxidations of polyalkyl aromatic compounds in which the aforementioned bromine-containing promoter systems are used, its use has not given entirely satisfactory results heretofore.

This invention thus provides improvements in a process for producing aromatic polycarboxylic acids by the oxidation of polyalkylated aromatic compounds. More particularly, this invention provides improvements in said oxidation process whereby a need for foreign organic liquid reaction medium is entirely avoided. Additionally, the invention provides improvements in said oxidation process whereby water is utilized as a reaction medium, but to considerably greater advantage than achieved heretofore. This invention further provides improvements in said oxidation process whereby the multiple alkyl functions of polyalkylated aromatic compounds are oxidized efficiently to produce polycarboxylic acids in high yield and purity.

In the process for the liquid-phase oxidation of polyalkyl aromatic compounds to prepare polycarboxylic acids which comprises contacting such compounds with molecular oxygen in the presence of bromine and a metal oxidation catalyst, this invention provides the improvement which comprises:

(a) oxidizing polyalkyl aromatic compound in a first stage until a major proportion, preferably about from 60 to 100% by weight, of said compound is oxidized to a product in which the polycarboxylic acid obtained by conversion of all the alkyl groups of the compound being oxidized to carboxylic acid groups is present in minor proportion, i.e., less than 50% by weight thereof, and partially oxidized compounds formed by conversion of less than all the alkyl groups of the compound being oxidized to carboxylic acid groups are present in major proportion, i.e., more than 50% by weight thereof, said first-stage oxidation being initiated at a temperature of about from 100 to 225° C., in the presence of 0 to about 15% of water based on the weight of the reaction mass and conducted thereafter at a temperature in said range, in the presence of less than about 50%, and preferably less than about 30%, of water based on the weight of the reaction mass; and (b) oxidizing said partially oxidized compounds from (a) to said polycarboxylic acid in a second stage, said second-stage oxidation being conducted at a temperature higher, preferably at least about 25° C. higher, than that in (a) and between about 175 and 350° C., the solids content of the reaction mass in (b) being maintained below about 70% by weight by the addition of water thereto.

"Stages" as used herein refer to sets of reaction conditions and, as illustrated in the example, not necessarily to different reaction vessels or zones.

Any of the aforementioned polyalkyl aromatic compounds can be used in the process of this invention. Isomeric mixtures of polyalkyl aromatic compounds, such as mixtures of o-, m-, and p-xylene, can be used as well as single compounds. Polyalkyl aromatic compounds in which each alkyl group contains from 1 to 4 carbon atoms and, in addition, in which the carbon atoms linking the alkyl groups to the cyclic aromatic nuclei are primary or secondary constitute a particularly suitable group of starting materials. Among these compounds, those containing a single carbocyclic aromatic ring or two bridged or fused carbocyclic aromatic nuclei and a total of two to four oxidizable alkyl substituents are particularly preferred. The starting compounds can, if desired, contain one or more additional relatively inert substituents, e.g., nitro, amino, halogen, or sulfonic acid groups, although aromatic hydrocarbons, particularly p-xylene, are preferred.

Any of the known metal oxidation catalyst can be used in the process of this invention, including light as well as heavy metal catalyst. However, heavy metal oxidation catalysts, particularly those in which the heavy-metal component is capable of existing in more than one polyvalent oxidation state are preferred. Among such metals, those of the first transition metal series, particularly those of atomic number 23 to 29, inclusive, are especially suitable for obtaining optimum yields and product purity. Cobalt alone and combinations of cobalt and manganese constitute especially preferred heavy metal species in the instant process. "Heavy metal" as used herein refers to metal so delineated in Lange's Handbook of Chemistry, 7th edition, pp. 58 and 59 (1949). The heavy metals used as oxidation catalysts are introduced into the oxidation reaction in the form of compounds that are soluble in the system or become at least partially solubilized under the conditions of the oxidation reaction at elevated temperature. Oxides, hydroxides, and particularly inorganic and organic salts of the catalyst metals, e.g., the acetates, naphthenates, toluates, and various other fatty acid salts of the meals meet this requirement and can be used. Cobalt acetate and mixtures of the acetates of cobalt and manganese have been found particularly effective in the process of this invention and hence constitute a preferred form of the heavy metal oxidation catalyst.

The metal oxidation catalyst compound or compounds will be present in the oxidation reactions in a concentration at least sufficient to promote oxidation. Concentrations that provide about from 0.02 to 2% by weight of metal (as metal), based n the polyalkyl aromatic starting compound, are very effective in this regard, and metal concentrations of 0.04 to 1% by weight are particularly suitable and are preferred.

The bromine promoter used in the instant oxidation process can be introduced in the form of elemental bromine or as one or more inorganic or organic compounds of bromine, such as hydrogen bromide, the alkali metal and ammonium bromides and bromates, mono- and polybromoalkanes such as ethyl bromide, ethylene dibromide or bromoform, aralkyl bromides such as benzyl bromide, and the like. Ammonium bromide has been found an especially suitable form for introducing the bromine. Alternatively, however, the bromine also can be introduced in the from of a bromide or bromate of one or more heavy metals, e.g., cobalt bromide or mixtures of cobalt bromide and manganese bromide, thus providing the heavy metal oxidation catalyst and bromine promoter in the same compound or compounds. The concentration of bromine or bromine compounds used in the oxidatins also will be sufficient to promote oxidation. In general, provision of about from 0.01 to 10 gram-atoms of bromine per gram-atom of heavy meal is effective. Optimum promotion of oxidation is, however, achieved when about from 2 to 5 gram-atoms of bromine is present per gram-atom of catalyst metal, and this concentration range is particularly preferred.

The oxidizing agent used in the process of this invention will be a gas containing molecular oxygen, i.e., oxygen itself, air, oxygen-enriched air, or other mixtures of molecular oxygen with one or more additional gases that are essentially inert under hte oxidation reaction conditions, such as nitrogen, carbon dioxide, argon, etc. For reasons of economy and safety, the preferred oxidizing agent in the instant process is air. Optimum yields of aromatic polycarboxylic acids are obtained when the molecular oxygen is employed in at least slight excess over the stoichiometric requirement for the particular oxidation being conducted, e.g., in 10 to 100% excess.

Two interrelated factors are of major importance to successful execution of the process of this invention. One of these is oxidation reaction temperature. It has been found that optimum results in terms of aromatic polycarboxylic acid yields and purity are obtained when the reaction temperature initially is sufficiently high that oxidation initiates easily and progresses at a rate sufficiently high that oxidation of a major proportion, generally at least 60% and preferably 95 to 100%, of the polyalkyl aromatic starting compound ot oxygenated derivatives is rapidly achieved, but not sufficiently high that more than a minor proportion, i.e., less than 50%, of the oxygenated derivatives consists of the polycarboxylic acid obtained by oxidation of all the alkyl groups to carboxylic acid groups in the compound being oxidized. An attempt to effect complete oxidation of all the alkyl groups to carboxylic acid groups at a single high temperature results in losses of starting material by degradation and other undesired side reactions. The particular temperature most effective for the first stage of oxidation will of course depend on the particular polyalkyl aromatic compound being oxidized, but in general, will be in the range of about from 100 to 225° C. For oxidation of p-xylene, for example, the temperature range of about 150 to 190° C., more particularly about 155 to 175° C., has been found to give acceptably high rates of oxidation coupled with minimum losses of starting material to non-useful products and hence is particularly preferred for the first-stage oxidation of this particular compound.

As indicated in the foregoing, reaction in the first stage of oxidation generally is terminated when the oxidation product contains not more than about 40% by weight of unreacted polyalkyl aromatic compound, and preferably when the product contains from 0 to about 5% thereof. In cases where such unoxidized starting compound is present, and particularly where the concentration of such compound exceeds about 5% of the oxidation product, it is preferred to separate the unreacted starting material from the remainder of the product by conventional procedures such as distillation before proceeding with further oxidation. Appreciable losses of unreacted polyalkyl aromatic compound by degradation and other side reactions tend to occur when such compounds are exposed to the higher temperatures found necessary, in accord with this invention, for efficient conversion of the partial oxidation products, produced in the first stage of oxidation, to aromatic polycarboxylic acids. Any unreacted polyalkyl aromatic compound recovered from the first-stage oxidation product can be recycled to this oxidation stage.

The first-stage oxidation product, which, for the stated reasons, preferably does not contain appreciable amounts of unoxidized polyalkyl aromatic compound, then is subjected to a second stage of oxidation at a temperature above that used in the first stage, preferably at least about 25° C. above the first-stage temperature, in order to complete the oxidation of the partial oxidation products therein to polycarboxylic acid in high yield and purity. Temperatures in the range of about from 175 to 350° C. are generally suitable for this second stage of oxidation. However, as in the first stage, the most effective temperature within the specified range will depend on the particular material being oxidized, and temperatures so high as to permit degradation of organic reactants and products should be avoided. To consider a particular example, it has been found very effective to complete the oxidation of a p-xylene partial oxidation product, substantially free of xylene but containing a minor amount of terephthalic acid and a major amount of p-toluic acid and other oxygenated p-xylene derivatives that are oxidizable to terephthalic acid, in the temperature range of about 200 to 275° C. and, more particularly, at about from 225 to 250° C. The terephthalic acid is substantially unaffected under these oxidation conditions.

For effective practice of the process of the instant invention, it not only is necessary that the oxidation temperature be increased during the course of the oxidation as described in the foregoing paragraphs, but also that there be control over the concentration of water present in the reaction mass during the succeeding stages of the process. Foreign organic reaction media are, however, unnecessary and preferably are not present in the present oxidation process. (By the expression "absence of foreign organic reaction media," it is intended that an oxidation reaction system shall not include more than incidental or trace amounts of organic compounds that are not reactants and/or products native to the particular oxidation being conducted.)

The polyalkyl aromatic compound to be oxidized can be substantially anhydrous, i.e., can contain on the order of 0-1% of water. However, it also is possible to heat the polyalkyl aromatic compound to the first-stage oxidation temperature by injection of pressurized steam that has been superheated to high temperatures, generally above 300° C., this being a particularly effective and rapid technique for bringing oxidizer charges to the oxidation temperature in large-scale operations. When this heating procedure is used, the initial oxidation charge will contain up to about 10% of water in the form of steam condensate. Generally speaking, for effective initiation of oxidation, the polyalkyl aromatic compound-containing charge at the start of reaction will contain a maximum of about 15% by weight of water, and preferably not more than about 10% of water. In some cases, the reaction temperature most effective for oxidation of a particular polyalkyl aromatic compound may be increased slightly if water is present.

Once the oxidation charge is heated to the first-stage oxidation temperature of about from 100 to 225° C. and the oxidation reaction initiated, as evidenced by the consumption of oxygen, considerably more water, i.e., up to about 50% by weight of the total organic reaction mass, can be tolerated without deleterious effects on the rate of oxidation or on the yields of the desired aromatic polycarboxylic acid products. In general, it is preferable that the concentration of water in the reaction mass during the post-initiation phase of the first stage of oxidation be held to a maximum of about 30% by weight thereof, and more particularly at a maximum of about from 10 to 20% thereof. All or a portion of the water produced in the oxidation reaction can be retained in the reaction mass, but ordinarily it is neither necessary nor desirable to add water during this first stage of oxidation.

In the second and higher-temperature stage of oxidation used to complete the conversion of partially oxidized polyalkyl aromatic compound derivatives to aromatic polycarboxylic acids, water will be present in a concentration such that the content of undissolved solid in the oxidation reactor at no time exceeds about 70% by weight of the second-stage reaction mass, and preferably does not exceed about 55% by weight thereof. An especially preferred second stage solids content is about from 25 to 50 weight percent of the reaction mass. A solids concentration above about 70% has been found to decrease the rate of oxidation appreciably even with efficient agitation, and also to allow degradation of organic components to occur so that the desired aromatic polycarboxylic acids are not obtained in high yield or high purity. When the first stage of oxidation has been conducted with partial or total retention of the water of reaction such that the first-stage product includes, for example, on the order of 10% by weight or more of water, it usually is unnecessary to introduce water at the beginning of the second, higher-temperature oxidation stage. However, depending particularly on the solubility characteristics of the aromatic polycarboxylic acid being produced, it usually will be necessary to introduce additional water during the course of the second-stage oxidation reaction in order to keep the solids content below the afore-specified maximum level. This water can be introduced as a single addition, or alternatively, it can be incorporated in several doses during the course of the second-stage oxidation.

The oxidation process of this invention will be operated at super-atmospheric pressures at least sufficient to maintain the major portion of the organic constituents in the liquid phase at the elevated temperatures of oxidation. Generally suitable pressures are in the range of about from 100 to 2500 p.s.i.g. (pounds per square inch gage), and more particularly, in the range of about from 200 to 1000 p.s.i.g. When it is necessary or desirable to retain water of reaction in the oxidation reaction mass, the minimum operating pressure will exceed the vapor pressure of water at the oxidation temperature. For example, in oxidation of xylene at the aforementioned preferred temperatures, operation at about from 400 to 600 p.s.i.g. allows retention of a portion to substantially all of the water of reaction.

The following example serves to illustrate the process of the invention and its advantages. In the example, the parts reported are parts by weight, except as otherwise noted.

EXAMPLE

The data recorded in the following table are obtained using a stainless steel autoclave of appropriate capacity, fitted with an external heating jacket, an internal coil for circulation of cooling water, a 3-blade agitator, and in the autoclave liquid space, a thermocouple connected to instruments for temperature control and recording. The autoclave also is provided with a vertical, water-cooled external condenser that leads to instruments for analysis of the oxidation offgases via a series of Dry Ice traps, for supplemental removal of condensible components from the gases, and an interposed pressure-reduction valve for expanding the gases to atmospheric pressure. A line for introducing the polyalkyl aromatic compound to be oxidized, the bromine-affording promoter, and the heavy metal oxidation catalyst is provided near the top of the autoclave, and air under pressure and metered by a rotameter is passed into the bottom of the autoclave through a 5-micron mesh filter acting as a dispenser. A line also is provided for pumping water into the autoclave when required.

In each of three runs, 531 parts of substantially anhydrous p-xylene, together with 2 parts of cobalt(II) acetate tetrahydrate, 2 parts of manganese(II) acetate tetrahydrate, and 4 parts of ammonium bromide, is charged to the autoclave. The autoclave then is sealed and brought to a pressure of 500 p.s.i.g. with air, and the temperature is raised to 155° C. These conditions of temperature and pressure are maintained for 1 hour while, with agitation, air is introduced at a rate of about 40 parts by volume per part by weight of p-xylene per minute, this rate of introduction being sufficient to provide an excess of molecular oxygen of approximately 50% over the theoretically needed to convert all the p-xylene to p-toluic acid during the 1-hour reaction period. The pressure during this period of reaction is sufficiently high that substantially all the water produced in the oxidation reaction is retained in the reaction mass. Consequently, by the end of this period of reaction, the reaction mass contains on the order of 12 to 15% water.

At the end of the one-hour reaction period, analysis of the liquid reaction mass shows that substantially all the p-xylene has been oxidized, and that the product of this period of reaction includes on the order of 20–25% terephthalic acid, the remaining 70–75% of the product being chiefly p-toluic acid with lesser amounts of other oxygenated derivatives of p-xylene oxidizable to terephthalic acid.

The temperature of the autoclave then is raised to 235° C., and oxidation is continued at this higher temperature under the aforespecified conditions of pressure (and water retention), agitation, and air feed rate. A slow increase in viscosity of the reaction mixture is noted, indicating a rise in solids content thereof, and approximately ½ hour after the increase in temperature to 235° C., 500 parts of water is pumped into the autoclave. The solids content is thereby decreased from on the order of 50 to 60% to about 30–40%. Without further addition of water, oxidation then is continued under the stated conditions for an additional 1¼ to 1¾ hours, or until analysis of the process offgases shows oxygen absorption, and oxidation, have ceased. The autoclave thereafter is cooled and vented prior to discharge of the organic reaction product. This product is filtered to separate solid terephthalic acid, and the filtered acid is given a single wash with water at ambient temperature before being subjected to analysis by a gas-phase chromatographic procedure. The following table reports the yields of terephthalic acid, based on moles of p-xylene charged, for each of the three runs, and also the purity of the acid produced in each case, as the difference between the sum of identifiable impurities (present in concentrations of at last 0.01%) and 100%.

| | TPA* Yield, Percent | TPA Purity, Wt. Percent |
|---|---|---|
| Run Number: | | |
| 1 | 92.14 | a 98.15 |
| 2 | 92.51 | b 97.85 |
| 3 | 91.75 | c 97.55 | a Identified impurities: 1.10% terephthalaldehydic (p-formylbenzoic) acid; 0.65% p-toluic acid; 0.10% benzoic acid.
b Identified impurities: 1.40% terephthalaldehydic acid; 0.60% p-toluic acid; 0.15% benzoic acid.
c Identified impurities: 1.50% terephthalaldehydic acid; 0.80% p-toluic acid; 0.15% benzoic acid.
*Terephthalic acid.

The data of the table clearly show the high yield of high-purity terephthalic acid obtained in the process of the invention, and also the consistency with which such yields and purities are achieved. The minor amounts of the other acids present can be removed from the terephthalic acid by known procedures such as fractional crystallization and extraction.

In order to demonstrate further the advantages of the instant process, reference now is made to the accompanying figures, in which the progress of oxidation of p-xylene under several different reaction conditions is measured by plotting oxygen absorption (measured in terms of oxygen concentration in the process offgases) against oxidation reaction time. In the figures, FIGURE 1 shows the progress of an oxidation conducted in accord with the process of this invention. For the first hour of reaction, the oxidation temperature is 155° C., and thereafter is 235° C. The operating pressure is such that substantially all the water of reaction is retained in the oxidizer, and approximately one-half hour after the temperature is raised to 235° C., water is injected into the reaction mass. Oxidation at the higher temperature continues for a further 1¼ to 1¾ hours before the oxygen content of the offgas rises to that of the air feed to the oxidizer, indicating that oxidation has ceased. Essentially all the p-xylene charged is oxidized, with over 90% being converted to terephthalic acid, the remainder of the product being principally p-toluic acid and smaller amounts of other intermediates oxidizable to terephthalic acid.

Figure 2:
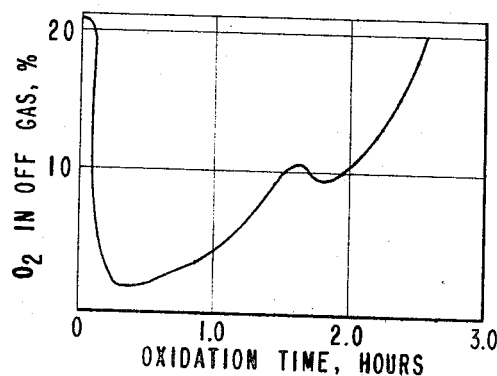

FIGURE 2 indicates, for comparison, the course of a p-xylene oxidation conducted at 195° C., throughout, i.e., in which the temperature is not staged, and in which water is added to the reaction mass 1½ hours after the start of oxidation. The reaction conditions otherwise are similar to those in the process of FIGURE 1. Oxidation in this case ceases after about 2¼ to 2½ hours. The final product contains a higher proportion of p-toluic acid and other partially oxidized p-xylene derivatives, i.e., on the order of 40% by weight, than the product of the FIGURE 1 process, and the amount of terephthalic acid is correspondingly smaller, i.e., on the order of 60% by weight. In addition, the conversion of p-xylene to useful products (terephthalic acid and precursors oxidizable thereto) is lower (on the order of 85%), more of the material being lost by degradation.

Figure 3:
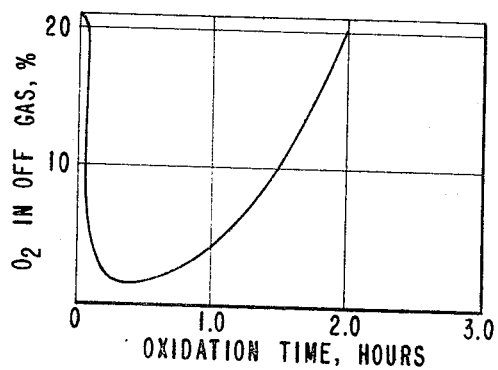

FIGURE 3 shows, also for comparison, the progress of an oxidation of p-xylene in which the reaction temperature is 155° C. throughout, no water is added, and in which the catalyst is cobalt(II) acetate alone. Oxidation in this case ceases after approximately two hours, and the product contains a major amount of p-toluic acid and other partially oxidized p-xylene derivatives (on the order of 75–80% by weight), but only a small amount of terephthalic acid (on the order of 20–25% by weight). The total product corresponds to a conversion of only about 80% of the p-xylene charged.

While the process of this invention has been illustrated in detail using p-xylene as a representative polyalkyl aromatic compound, it also is applicable to other compounds to prepare a variety of useful aromatic polycarboxylic acids. Some of the additional polyalkyl aromatic compounds that can be substituted on an equivalent weight basis for p-xylene and oxidized in accordance with the general procedure described above, together with the aromatic polycarboxylic acids obtainable therefrom, are given below:

| | |
|---|---|
| o-Xylene | Isophthalic acid |
| m-Xylene | Terephthalic acid |
| p-Ethyltoluene | o-Phthalic acid |
| o-Isobutyltoluene | Terephthalic acid |
| p-Diisopropylbenzene | Trimesic acid |
| Mesitylene | Trimellitic acid |
| Pseudocumene | Pyromellitic acid |
| Durene | Naphthalenedicarboxylic acid |
| Dimethylnaphthalene isomers | Diphenic (biphenyldicarboxylic) acids |
| Dimethylbiphenyl isomers | |
| Ditolylethanes | Phthalic acids |
| o-Phthalic acid | |

Similarly, cobalt acetate alone can be substituted on an equivalent weight basis (as metal) for the mixed metal catalyst shown in the above example, or alternatively, equivalent amounts of one or more of the metals vanadium, chromium, manganese, iron, cobalt, nickel, and copper in the form of soluble oxides and salts, particularly salts of carboxylic acids containing up to about 8 carbons in the molecule can be substituted. Also, terephthalic acid can be obtained in accordance with this invention by using an equivalent amount of bromine in the form of heavy-metal bromide, hydrogen bromide, or alkali metal bromide, rather than as ammonium bromide.

The oxidation procedure outlined hereinbefore for illustration purposes also can be varied and modified in several respects. As is illustrated in the example, the two oxidation stages, as hereinbefore defined, can be conducted as batch operations in a single reaction vessel or zone. However, provided that the sets of reaction conditions specified for the oxidation stages are maintained, it also is possible and within the scope of invention to conduct the oxidation stages in separate vessels or zones, or alternatively, to effect one or both of the oxidation stages in a series of oxidation zones or oxidizers, so that the stages are effectively divided into a plurality of substages. The oxidation stages additionally can be conducted as either semicontinuous or fully continuous operations, and the flow of oxidizing gas can be generally concurrent with the flow of organic components in the system or can be generally countercurrent thereto.

While the process of this invention is highly efficient and economical in several respects, it is particularly advantageous in terms of the yields and purity of the aromatic polycarboxylic acids obtainable thereby. Overall polycarboxylic acid yields, based on polyalkyl aromatic starting compound, of the order of 85% and generally 90% or higher have been demonstrated with great consistency. The purity of the acids so produced also is high, purities of the order of 95% and often 97–98% having been obtained after minimum purification of the oxidation products. Thus the need for rigorous purification procedures to provide polymer-grade polycarboxylic acids from the crude oxidation products has been minimized.

We claim:
1. In the process for the liquid-phase oxidation of polyalkyl aromatic compounds to polycarboxylic acids which comprises contacting said compounds with molecular oxygen in the presence of bromine and a metal oxidation catalyst, the improvement which comprises:
   (a) oxidizing polyalkyl aromatic compound in a first stage until a major proportion of said compound is oxidized to a product in which the polycarboxylic acid obtained by conversion of all the alkyl groups of the compound being oxidized is present in minor proportion and partially oxidized compounds formed by conversion of less than all the alkyl groups of the compound being oxidized to carboxylic acid groups are present in major proportion, said first-stage oxidation being initiated at a temperature of about from 100 to 225° C., in the presence of 0 to about 15% of water based on the weight of the reaction mass and conducted thereafter at a temperature in said range, in the presence of less than about 50% of water based on the weight of the reaction mass; and
   (b) oxidizing said partially oxidized compounds from (a) to said polycarboxylic acid in a second stage, said second-stage oxidation being conducted at a temperature higher than that in (a) and between about 175 and 350° C., the solids content of the reaction mass in (b) being maintained below about 70% by weight by the addition of water thereto.

2. In the process for the liquid-phase oxidation of p-xylene to terephthalic acid which comprises contacting p-xylene with molecular oxygen in the presence of bromine and a heavy metal oxidation catalyst, the improvement which comprises:
   (a) oxidizing p-xylene in a first stage until a major proportion thereof is oxidized to a product in which terephthalic acid is present in minor proportion and partially oxidized compounds formed by conversion of less than both the methyl groups of said p-xylene to carboxylic acid groups are present in major proportion, said first-stage oxidation being initiated at a temperature of about from 150 to 190° C., in the presence of 0 to about 15% of water based on the weight of the reaction mass and conducted thereafter at a temperature in said range, in the presence of less than about 50% of water based on the weight of the reaction mass; and
   (b) oxidizing said partially oxidized compounds from (a) to terephthalic acid in a second stage, said second-stage oxidation being conducted at a temperature of about from 200 to 275° C., the solids content of the reaction mass in (b) being maintained below about 70% by weight by the addition of water thereto.

3. A process of claim 2 wherein the maximum water content during Stage (a) is less than about 30% by weight, the partially oxidized compounds oxidized in Stage (b) are substantially free of p-xylene, the water content in (b) is such that the solids content is less than about 55% by weight, and the temperature in (b) is at least about 25° C. higher than that in (a).

4. A process for preparing terephthalic acid which comprises oxidizing p-xylene with air under superatmospheric pressure sufficient to maintain the p-xylene in the liquid phase in the presence of ammonium bromide and a mixture of cobalt (II) and manganese (II) acetates, said oxidation being carried out in a first stage to yield an oxidation product, a major proportion of which is p-toluic acid, and in a second stage to yield terephthalic acid, the oxidation in the first stage being initiated at a temperature of about from 155 to 175° C. in the presence of 0 to about 10% of water based on the weight of the reaction mass and conducted thereafter at a temperature in said range, in the presence of less than about 30% of water based on the weight of the reaction mass, and the oxidation in the second stage being carried out at a temperature of about from 225 to 250° C. in the presence of sufficient water to maintain the solids content of the second-stage reaction mass at less than about 55% by weight, the concentration of p-xylene in the charge to the second-stage oxidation being 0 to about 5% by weight.

References Cited

UNITED STATES PATENTS 3,089,907   5/1962   Saffer et al. _____ 260—524

FOREIGN PATENTS 908,736   10/1962   Great Britain.

HENRY R. JILES, *Primary Examiner.*